(12) United States Patent
Wagner

(10) Patent No.: US 8,781,993 B2
(45) Date of Patent: Jul. 15, 2014

(54) NEARLY ORTHOGONAL LATIN HYPERCUBES FOR OPTIMIZATION ALGORITHMS

(75) Inventor: Ronald E. Wagner, Fleming Island, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 558 days.

(21) Appl. No.: 12/807,885

(22) Filed: Sep. 16, 2010

(65) Prior Publication Data

US 2014/0052677 A1    Feb. 20, 2014

Related U.S. Application Data

(60) Provisional application No. 61/342,100, filed on Apr. 9, 2010.

(51) Int. Cl.
*G06F 17/00* (2006.01)
*G06N 7/00* (2006.01)
*G06N 7/08* (2006.01)

(52) U.S. Cl.
USPC .......................................................... 706/59

(58) Field of Classification Search
None
See application file for complete search history.

(56) References Cited

U.S. PATENT DOCUMENTS

| 6,061,581 | A  | * | 5/2000  | Alam et al. ................... 600/310 |
| 6,708,073 | B1 | * | 3/2004  | Heavlin ........................ 700/121 |
| 2010/0318327 | A1 | * | 12/2010 | Holden et al. ................... 703/1 |

OTHER PUBLICATIONS

Cioppa, T., Lucas, T., "Efficient Nearly Orthogonal and Space-Filling Latin Hypercubes" Technometrics; Feb. 2007;49, 1.*
Hernandez, Alejandro S. "Breaking barriers to design dimensions in nearly orthogonal Latin hypercubes." (2008).*
Yang, J. Y., and Min-Qian Liu. "Construction of orthogonal and nearly orthogonal Latin hypercube designs from orthogonal designs." Statistica Sinica 22 (2012): 433-442.*
Joshua, Ang Keng-Ern. Extending orthogonal and nearly orthogonal Latin hypercube designs for computer simulation and experimentation. Naval Postgraduate School Monterey CA, 2006.*
Sagan, Hans. Space-filling curves. vol. 18. New York: Springer-Verlag, 1994.*
Sanchez, Susan M. "Work smarter, not harder: guidelines for designing simulation experiments." Proceedings of the 37th conference on Winter simulation. Winter Simulation Conference, 2005.*

* cited by examiner

*Primary Examiner* — Kakali Chaki
*Assistant Examiner* — Daniel Pellett
(74) *Attorney, Agent, or Firm* — Daniel J. Long

(57) ABSTRACT

Nearly orthogonal latin hypercubes are used in optimization algorithms for creating an expanded and synthetically-generated data set to improve an initial optimization algorithm.

6 Claims, 1 Drawing Sheet

NEARLY ORTHOGONAL LATIN HYPERCUBES FOR OPTIMIZATION ALGORITHMS

RELATED APPLICATIONS

This Application claims rights under 35 USC §119(e) from U.S. Application Ser. No. 61/342,100 filed Apr. 9, 2010, the contents of which are incorporated herein by reference.

FIELD OF THE INVENTION

This invention relates to optimization algorithms and more particularly to the utilization of nearly orthogonal latin hypercubes to reduce the data required for an embedded optimization algorithm by creating synthetic data used to improve an initial optimization algorithm.

BACKGROUND OF THE INVENTION

Optimization algorithms have been utilized to be able to optimize processes in which a large amount of data is processed from sensors which sense various of the measurable quantities within a monitored system. This large amount of data has been utilized in the past to derive an initial optimization algorithm which is then used to optimize a monitored system.

Optimization algorithms are those that can include both diagnostics and prognostications. One such system involving the PRDICTR algorithm is described in U.S. patent application Ser. No. 12/548,683 by Carolyn Spier filed on Aug. 27, 2009, assigned to the assignee hereof and incorporated herein by reference.

When however it is important to embed an optimization algorithm at a point of performance such as on a vehicle, due to the large amount of data originally required for providing robust optimization, there needs to be a way of reducing the amount of sensor data required in order to derive an initial optimization algorithm, so that the optimization algorithm can be placed at the point of performance.

Thus, there is a need to create an optimization algorithm that one can embed at the point of performance. The normal method of creating such an algorithm is precluded because of the necessity of collecting a large amount of data and then finding a vector through the data that has the highest coefficient of goodness of fit. For vehicle embedded systems, this approach is impractical. Moreover, vehicle health monitoring systems invariably have small numbers of monitored parameters in which only a few variables on vehicles are monitored.

Note that vehicles exhibit a number of different failure modes and monitored conditions can include the number of hours of operation, a number of interactions, and numbers of specific environments that are encountered by the vehicle. However, if the monitored data is a small data set, then oftentimes it is difficult to justify a complete optimization algorithm study such as that produced by the aforementioned PRDICTR algorithm.

Note that if one could wait to collect data on all of the failure modes of a vehicle and then find the performance vector that suggests how the system is going to fail in a new environment, then it would be possible to derive the appropriate optimization algorithm.

However, when the amount of data is limited and one cannot interpolate a vector through the modest amount of data, there needs to be a way of synthetically generating data in order to be able to derive an initial optimization algorithm.

SUMMARY OF INVENTION

In order to provide the aforementioned synthetic data, the subject system utilizes the nearly orthogonal latin hypercube methodology to create a synthetic data set. This synthetic data set is then utilized at the point of performance to improve an initial optimization algorithm. Over time, the observed data is substituted for the synthetic data, thus to even further improve the optimization algorithm.

The use of the nearly orthogonal latin hypercube methodology enables one to improve an original algorithm so as to transform it into a skinny optimization algorithm or a "light" algorithm source. The use of the nearly orthogonal latin hypercube methodology also reduces the amount of data that has to be transmitted, with the nearly orthogonal latin hypercube methodology serving as a tool to speed the improvement of the optimization algorithm.

Note, that if there are enough sensors and enough bandwidth, one can use remote processing and even clusters of computers to arrive at the appropriate optimization algorithm. However, if one could embed the optimization algorithm at the point of performance, one could eliminate massive off-board processing.

In short, the utilization of the nearly orthogonal latin hypercube methodology enables one to derive a light and therefore embeddable optimization algorithm using synthetic data rather than waiting to observe the data, while at the same time eliminating massive data transfers to a remote processing site.

In summary, nearly orthogonal latin hypercubes are used in optimization algorithms for creating an expanded and synthetically-generated data set to improve an initial optimization algorithm.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
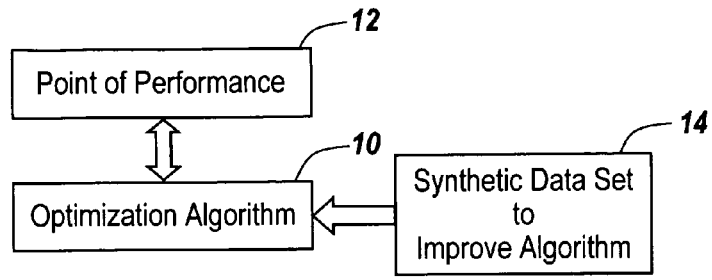
FIG. 1 is a diagrammatic illustration of the utilization of an optimization algorithm at the point of performance in which the initial optimization algorithm is improved through the utilization of the nearly orthogonal latin hypercube methodology that provides synthetic data.

Referring now to FIG. 1, an optimization algorithm 10 is embedded at the point of performance 12 which may, for instance, be at a vehicle or any other point in a monitored system. The purpose of the utilization of the nearly orthogonal latin hypercube (NOLH) technique is to be able to provide from a limited data set a synthetic data set that is utilized to improve an initial optimization algorithm 10. The synthetic data set 14 is generated as can be seen from FIG. 2 using nearly orthogonal latin hypercube methodology.

Figure 2:
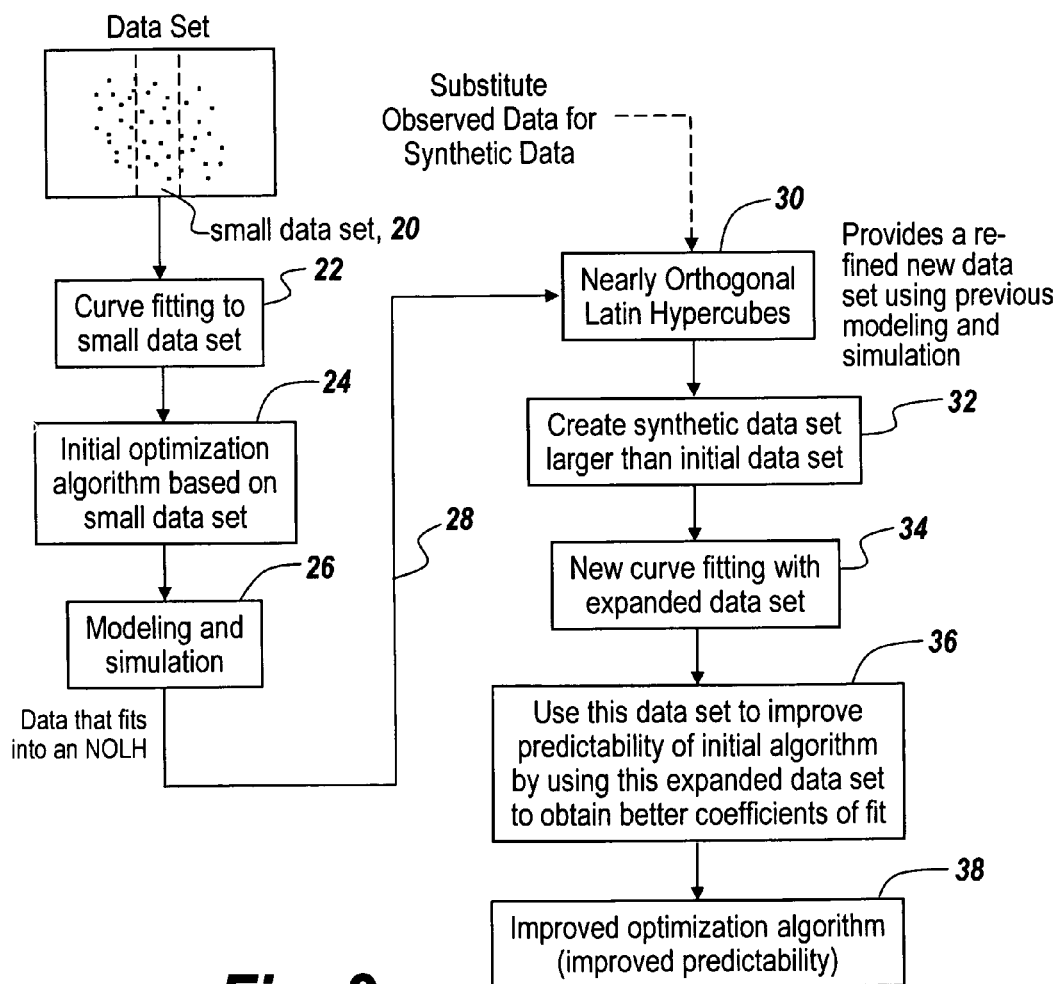
FIG. 2 is a block diagram showing the utilization of the nearly orthogonal latin hypercube methodology to create a synthetic data set that is larger than an initial small data set such that curve fitting to the expanded data set permits deriving an improved initial optimization algorithm.

Referring now to FIG. 2, a small data set 20 used to derive an initial algorithm. To do this, the small data set is isolated in the monitored or sensed data, and curve fitting 22 is applied to the small data set to provide vectors that enable the derivation of an initial optimization algorithm 24 based on the small data set. The initial optimization algorithm includes modeling and simulation 26 that results in data that can be fit into a nearly orthogonal latin hypercube process. This data, as illustrated on line 28, is input to a nearly orthogonal latin hypercube processor 30 that provides a new data set using the previous modeling and simulation. The result is the creation of a synthetic data set 32 that is larger than the initial data set and new curve fitting is applied to this expanded data set, as illustrated at 34, to correct the initial optimization algorithm as illustrated at 36.

To do this and, as illustrated at 38, the expanded data set is used to improve the initial algorithm by using the observed data to obtain better fit coefficients.

As can be seen, after the initial optimization algorithm has been improved using the NOLH technique, observed data can be substituted at NOLH processor 30, to even further improve the optimization algorithm.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus for improving an initial optimization algorithm that uses a curve-fit small data set and expands the small data set to provide an expanded data set on which curve fitting is imposed to optimize the initial optimization algorithm comprising:
    a specialized processor for generating an expanded data set of synthetic data points generated from the set of data points that is the result of creating an initial optimization algorithm using said small data set, the synthetic data points being generated using a nearly orthogonal latin hypercubes algorithm, said expanded data set of synthetic data points being used by said initial optimization algorithm to provide corrected optimization algorithm coefficients.

2. The apparatus of claim 1, wherein said synthetic data set provided by said nearly orthogonal latin hypercubes algorithm is utilized to modify the initial optimization algorithm to obtain better coefficients of fit.

3. Apparatus for improving an optimization algorithm generated utilizing a small data set that describes a monitored system, comprising:
    a small data set generated from a larger data set by considering data only within a predetermined range;
    an engine programmed with a nearly orthogonal latin hypercubes algorithm;
    a specialized processor for deriving an initial vector corresponding to a curve fitted to the small data set,
    said specialized processor utilizing the initial vector to create an initial optimization algorithm, and providing from the initial optimization algorithm an initial data set that fits into said nearly orthogonal latin hypercubes, said specialized processor creating from the nearly orthogonal latin hypercube algorithm a synthetic data set larger than the small set utilized in deriving the initial optimization algorithm;
    a curve fitting module for deriving a new vector corresponding to a new curve fitting with the expanded data set; and,
    a coefficient correction generator using the new vector to correct coefficients in the initial optimization algorithm.

4. The apparatus of claim 3, wherein said initial optimization algorithm is created by modeling and simulation utilizing said initial vector.

5. The apparatus of claim 3, and further including a substitution unit for substituting observed data into the nearly orthogonal latin hypercube algorithm for the initial data set, thereby to create a further expanded synthetic data set corrected by the observed data, such that with new curve fitting to said further expanded synthetic data set, the resulting new curve fitting vector provides predictability that is increased over that associated with the initial optimization algorithm whereby the further expanded data set is used to obtain better coefficient of fit.

6. The apparatus of claim 5, wherein said further expanded new synthetic data set is corrected for observed data.

* * * * *